US011758392B1

United States Patent
Li

(10) Patent No.: US 11,758,392 B1
(45) Date of Patent: Sep. 12, 2023

(54) ELECTRONIC TAG DEVICE

(71) Applicant: Bing Xuan Li, Hsinchu (TW)

(72) Inventor: Bing Xuan Li, Hsinchu (TW)

(*) Notice: Subject to any disclaimer, the term of this patent is extended or adjusted under 35 U.S.C. 154(b) by 0 days.

(21) Appl. No.: 17/975,060

(22) Filed: Oct. 27, 2022

(51) Int. Cl.
*H04W 12/00* (2021.01)
*G06K 17/00* (2006.01)
*G07C 5/08* (2006.01)
*H04W 12/04* (2021.01)

(52) U.S. Cl.
CPC ........ *H04W 12/00* (2013.01); *G06K 17/0029* (2013.01); *G07C 5/0841* (2013.01); *H04W 12/04* (2013.01)

(58) Field of Classification Search
CPC ...... G06Q 10/00; G06Q 19/08; G06Q 10/087; G06Q 30/00; G06Q 30/02; G06Q 10/08; G06K 9/00; G06K 9/00362; G06K 17/00; G06K 17/0029; B67D 7/00; B67D 7/04; G08G 1/00; G08G 1/01; G08B 13/14; H04W 12/00; H04W 12/04; G07C 5/0841
See application file for complete search history.

(56) References Cited

U.S. PATENT DOCUMENTS

| | | | |
|---|---|---|---|
| 2014/0205155 A1* | 7/2014 | Chung | G06Q 50/26 382/115 |
| 2014/0207629 A1* | 7/2014 | Bradley | G06Q 10/087 705/28 |
| 2014/0310074 A1* | 10/2014 | Gravelle | G08G 1/20 705/13 |
| 2015/0195765 A1* | 7/2015 | Bhardwaj | H04L 67/12 370/338 |
| 2019/0188761 A1* | 6/2019 | Dheedene | G06Q 50/30 |
| 2020/0344602 A1* | 10/2020 | Li | H04L 67/125 |

OTHER PUBLICATIONS

NPL Search (Apr. 19, 2023).*

* cited by examiner

*Primary Examiner* — Van T Trieu
(74) *Attorney, Agent, or Firm* — Zhigang Ma

(57) ABSTRACT

An electronic tag device includes: a processor, an OBD circuit and a radio frequency identification (RFID) tag chip; the processor is used to transmit an OBD data request command set to an OBD interface of a vehicle through the OBD circuit to thereby enable the vehicle to output OBD data in response to the OBD data request command set; and the processor is further configured to obtain target OBD data based on the OBD data obtained from the OBD interface of the vehicle through the OBD circuit and convert the target OBD data; and the RFID tag chip is configured to obtain and store the converted target OBD data from the processor to thereby allow a server to obtain the converted target OBD data from the RFID tag chip. The electronic tag device can be used in the variety of application scenes.

20 Claims, 5 Drawing Sheets

ELECTRONIC TAG DEVICE

TECHNICAL FIELD

The disclosure relates to the field of electronic tag communication technologies, in particular to an electronic tag device.

BACKGROUND

With the rapid development of Internet of Things (IoT) technology, radio frequency identification (RFID) electronic tags with identification, object tracking, information collection and other functions have been widely used in industrial automation, commercial automation and many other fields. The RFID electronic tags belong to a non-contact automatic identification technology. They use radio frequency signals to identify target objects and obtain relevant data. The identification work does not require manual intervention. As a wireless version of barcode, the RFID technology has the advantages of waterproof, antimagnetic, high temperature resistant, long service life, large reading distance, data on the tag can be encrypted, larger storage capacity, free change of storage information, etc.

However, existing electronic tag devices disposed on vehicles have a single function, and are only used to realize the toll collection without stopping when driving on the highway. Therefore, how to expand functions of the electronic tag device disposed on the vehicle to meet the needs of a variety of application scenes is a problem to be solved urgently.

SUMMARY

The disclosure provides an electronic tag device, the electronic tag device can be connected to an OBD (abbreviation for on-board diagnostics) interface of a vehicle, thereby obtaining OBD data of the vehicle, therefore the electronic tag device can obtain target OBD data based on the OBD data obtained from the vehicle, the electronic tag device is not only used for the toll collection without stopping, but also can be used in the variety of application scenes because the OBD data can be obtained.

In an embodiment, the disclosure provides an electronic tag device including: a processor; an OBD circuit, connected to the processor; and a radio frequency identification (RFID) tag chip, connected to the processor;
the processor is configured ((i.e., structured and arranged)) to transmit an OBD data request command set to an OBD interface of a vehicle through the OBD circuit to thereby enable the vehicle to output OBD data in response to the OBD data request command set; and
the processor is further configured to obtain first target OBD data based on the OBD data obtained from the OBD interface through the OBD circuit and convert the first target OBD data; and
the RFID tag chip is configured to obtain and store the converted first target OBD data from the processor to thereby allow a first server to obtain the converted first target OBD data from the RFID tag chip.

In an embodiment, the processor is specifically configured to select at least some of the OBD data as the first target OBD data; or the processor is specifically configured to calculate the first target OBD data based on at least some of the OBD data.

In an embodiment, the electronic tag device further includes: a cellular communication circuit, connected to the processor and configured to wirelessly connect a second server;
the processor is further configured to obtain second target OBD data based on the OBD data obtained from the OBD interface through the OBD circuit, and transmit the second target OBD data to the cellular communication circuit to thereby allow the second server to obtain the second target OBD data from the cellular communication circuit.

In an embodiment, the processor is specifically configured to select at least some of the OBD data as the second target OBD data, or the processor is specifically configured to calculate the second target OBD data based on at least some of the OBD data; and the cellular communication circuit is specifically configured to: receive the second target OBD data, encrypt the second target OBD data, and wirelessly transmit the encrypted second target OBD data to the second server.

In an embodiment, the electronic tag device further includes: a wireless data transmission circuit, connected to the processor and configured to wirelessly connect an electronic device;
the processor is further configured to obtain third target OBD data based on the OBD data obtained from the OBD interface through the OBD circuit, and transmit the third target OBD data to the wireless data transmission circuit to thereby allow the electronic device to obtain the third target OBD data from the wireless data transmission circuit for user viewing.

In an embodiment, the processor is specifically configured to select at least some of the OBD data as the third target OBD data, or the processor is specifically configured to calculate the third target OBD data based on at least some of the OBD data; and the wireless data transmission circuit is specifically configured to receive the third target OBD data, encrypt the third target OBD data, and wirelessly transmit the encrypted third target OBD data to the electronic device.

In an embodiment, the OBD circuit comprises: a controller area network (CAN) to universal asynchronous receiver/transmitter (UART) converter, connected to the processor and configured to connect the OBD interface of the vehicle.

In an embodiment, the RFID tag chip is a ISO18000-6C tag chip; and the processor is specifically configured to perform data format conversion on the first target OBD data to obtain the converted first target OBD data meeting ISO18000-6C, and transmit the converted first target OBD data to the RFID tag chip.

In an embodiment, the cellular communication circuit includes: a baseband processor, provided with a subscriber identity module (SIM) interface configured to connect a SIM card; and a radio frequency (RF) transceiver, connected to the baseband processor.

In an embodiment, the wireless data transmission circuit includes: a BLUETOOTH communication circuit connected to the processor and configured to wirelessly connect the electronic device.

In an embodiment, the electronic tag device further includes: a memory connected to the processor; and the BLUETOOTH communication circuit is further configured to receive BLUETOOTH data from the electronic device, convert the BLUETOOTH data, and transmit the converted BLUETOOTH data to the processor; and the processor is configured to store the converted BLUETOOTH data into the memory.

In an embodiment, the processor, the memory and the BLUETOOTH communication circuit are integrated in a single chip.

In an embodiment, the electronic tag device further includes: a cellular communication circuit, connected to the processor and configured to wirelessly connect a third server; a memory, connected to the processor and configured to store multiple sets of tag data corresponding to different geographic regions; and a positioning circuit, connected to the cellular communication circuit;

the positioning circuit is configured to obtain current positional data of the electronic tag device and transmit the current positional data to the cellular communication circuit;

the cellular communication circuit is configured to receive the current positional data, wirelessly transmit the current positional data to the third server to thereby enable the third server to output a tag data updating instruction in response to a current geographical region where the electronic tag device is located determined by the current positional data is different from a previously determined geographical region, wirelessly receive the tag data updating instruction from the third server, and transmit the tag data updating instruction to the processor; and the processor is further configured to obtain a target set of tag data corresponding to the tag data updating instruction from the multiple sets of tag data stored in the memory and transmit the target set of tag data to the RFID tag chip for tag data updating.

In an embodiment, each set of the multiple sets of tag data includes: an electronic product code (EPC) and a tag identifier (TID), and the TIDs of the multiple sets of tag data comprise multiple account information corresponding to the different geographical regions respectively, and the TID of the target set of tag data includes one of the multiple account information corresponding to the current geographical region being one of the different geographical regions.

In an embodiment, the positioning circuit includes: a global navigation satellite system (GNSS) integrated circuit (IC) connected to the cellular communication circuit, and a GNSS antenna connected to the GNSS IC.

In an embodiment, the electronic tag device further includes: a wireless data transmission circuit, connected to the processor and configured to connect an electronic device; the memory, the processor and the wireless data transmission circuit are integrated in a SoC controller; and the positioning circuit and the cellular communication circuit are integrated in a cellular communication and positioning chip.

In an embodiment, the SoC controller is connected to the cellular communication and positioning chip via a universal asynchronous receiver/transmitter (UART) bus, the SoC controller is connected to the RFID tag chip via an inter-integrated circuit (I2C) bus, the SoC controller is connected to the OBD circuit via another UART bus, and the OBD circuit is connected to the OBD interface via a CAN bus.

In an embodiment, the electronic tag device further includes: a power protected circuit, connected to the processor; a universal serial bus (USB) type-C interface, connected to the power protected circuit and configured to connect an in-vehicle power supply; a PCB antenna, connected to the RFID tag chip; and a light emitting diode (LED) indicator, connected to the processor, and wherein the LED indicator is configured to emit light of different colors for indicating different working states of the electronic tag device.

In an embodiment, the electronic tag device further includes: a cellular external antenna connection port, connected to the cellular communication circuit; and a GPS external antenna connection port, connected to the positioning circuit.

In an embodiment, the electronic tag device further includes: a SIM slot, connected to the cellular communication circuit; and a SIM card, disposed in the SIM slot.

Beneficial effects can be achieved of the disclosure are as follows.

The electronic tag device is provided with the OBD circuit for connecting the OBD interface of the vehicle, the OBD circuit of the electronic tag device can obtain the OBD data from the vehicle, and the processor can obtain the target OBD data based on the OBD data obtained from the vehicle, therefore the electronic tag device is not only used for the toll collection without stopping, but also can be used in the variety of application scenes because the OBD data can be obtained. In an application scene, the processor of the electronic tag device can convert the target OBD data, the RFID tag chip can store the converted target OBD data, the server can obtain the converted target OBD data through the RFID tag chip, the server may be the authenticated electronic toll collection (ETC) server and the converted target OBD data may include vehicle exhaust data, the authenticated ETC server can obtain the vehicle exhaust data from the RFID tag chip, therefore it is convenient for relevant departments such as traffic management department or environmental protection department to monitor the carbon emissions of the vehicles, and it is beneficial for the relevant departments to manage vehicles. In another application scene, the target OBD data may include vehicle basic parameters such as a fuel consumption, a driving distance, an odometer data, and a fuel tank level; in the logistics company, when a vehicle driver e.g., a truck driver drives the truck disposed with the electronic tag device, the logistics company can know driving conditions of the truck based on the target OBD data, and thus it can avoid the problem of the truck driver stealing fuel such as gasoline on the way, and the transportation cost of the logistics company can be reduced. In a still another application scene, the target OBD data may include vehicle fault diagnosis data, vehicle maintenance personnel can directly obtain the vehicle fault diagnosis data for vehicle fault diagnosis and vehicle maintenance, the operation of obtaining data is simple and efficient. The electronic tag device can obtain the target OBD data based on the OBD data, and output the target OBD data through the RFID tag chip, the cellular communication circuit and/or the wireless data transmission circuit, thereby to meet actual needs, and the application scope of the electronic tag device is wider.

Furthermore, the memory of the electronic tag device can be stored with the multiple sets of tag data corresponding to different geographic regions respectively, the electronic tag device can acquire the positional data in real time or periodically and transmit the positional data to the server, the server output the tag data updating instruction when it determines that the current geographical region where the electronic tag device is located determined by the positional data is different from a previously determined geographical region, i.e., the geographical region of the electronic tag device has changed, the electronic tag device obtain the target set of tag data corresponding to the tag data updating instruction from the multiple sets of tag data to complete tag data updating. Therefore, when the electronic tag device disclosed by the disclosure is disposed on the vehicle, an additional expense for toll settlement caused by an existing electronic tag device of the vehicle being bound with only one account information can be saved. It is conducive to the development of the automobile leasing industry.

BRIEF DESCRIPTION OF DRAWINGS

In order to more clearly explain embodiments of the disclosure or the technical schemes in the prior art, the following will briefly introduce the drawings that need to be used in the description of the embodiments or the prior art. It is obvious that the drawings in the following description are only some of the embodiments of the disclosure. For those skilled in the art, other drawings can be obtained according to the structure shown in these drawings without paying creative work.

A realization of purposes, functional characteristics and advantages of the disclosure will be further described with reference to the attached drawings in combination with some embodiments.

DETAILED DESCRIPTION OF EMBODIMENTS

The technical schemes in the embodiments of the disclosure will be clearly and completely described below in combination with the drawings in the embodiments of the disclosure. Apparently, the described embodiments are only some of the embodiments of the disclosure, not all of them. Based on the embodiments in the disclosure, all other embodiments obtained by those skilled in the art without creative work should be within the scope of the disclosure.

In the disclosure, unless specific provisions and limitations, the terms "connect", "dispose" and etc., should be understood in a broad sense. For example, the term "connect" can be directly connected, indirectly connected through an intermediate medium, fixedly connected, a detachably connected, integrated into one, or electrically connected. It can be a connection within two elements or an interactive relationship between the two elements, unless the specific provisions and limitations, for those skilled in the art, the specific meaning of the above terms in the disclosure can be understood according to the specific situation.

In addition, the technical schemes among various embodiments can be combined with one another, but it must be based on the realization of those skilled in the art. When the combination of technical schemes is contradictory or impossible, it should be considered that the combination of technical schemes does not exist and is not within the protection scope of the disclosure.

Figure 1:
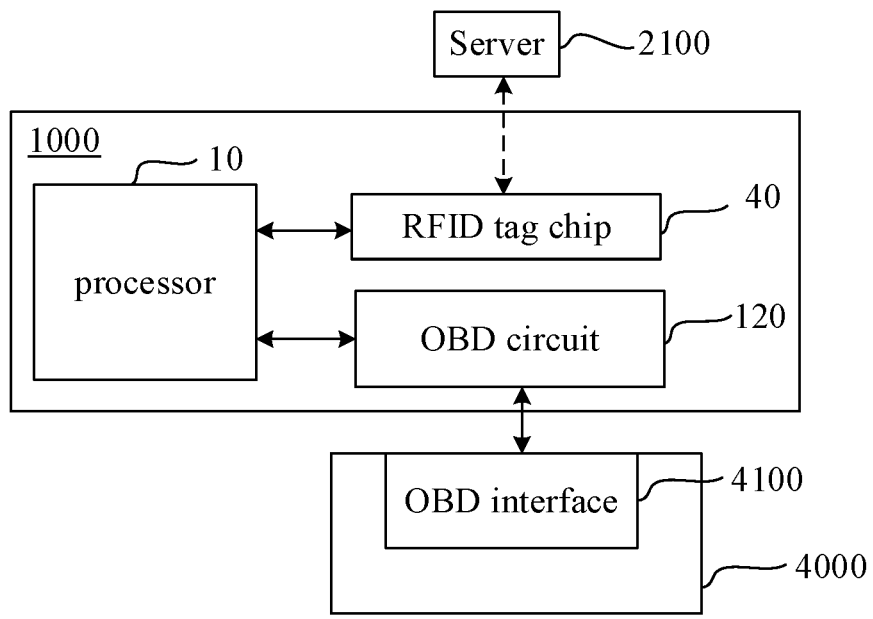
FIG. 1 shows a schematic structural diagram of an electronic tag device according to an embodiment of the disclosure.

An embodiment of the disclosure provides an electronic tag device 1000, as shown in FIG. 1, the electronic tag device 1000 includes a processor 10, a RFID tag chip 40 and an OBD circuit 120. Owing to the configuration of the OBD circuit 120, the electronic tag device 1000 hereinafter also referred to as OBD electronic tag device.

The OBD circuit 120 is connected to the processor 10. The RFID tag chip 40 is connected to the processor 10. The processor 10 is configured (i.e., structured and arranged) to transmit an OBD data request command set to an OBD interface 4100 of a vehicle 4000 through the OBD circuit 120 to thereby enable the vehicle 4000 to output OBD data in response to the OBD data request command set. The processor 10 is further configured to obtain target OBD data based on the OBD data obtained from the OBD interface 4100 of the vehicle 4000 through the OBD circuit 120 and convert the target OBD data. The RFID tag chip 40 is configured to obtain and store the converted target OBD data from the processor 10 to thereby allow a server 2100 to obtain the converted target OBD data from the RFID tag chip 40.

Specifically, in some embodiments, the OBD data request command set is predetermined by a user. For example, the OBD data request command set includes at least one OBD data request command, and each the OBD data request command corresponds to at least one OBD data. For another example, the user presets a plurality of OBD data request commands and stores them in a memory, and then the user selects at least one OBD data request command from the plurality of OBD data request commands to form the OBD data request command set to be output through the processor 10. For still another example, the user presets a plurality of OBD data request command sets and stores them in a memory, and then the user selects the required OBD data request command set from the plurality of OBD data request command sets and outputs through the processor 10. For even still another example, the user controls the processor 10 to generate the OBD data request command set in real time.

In some embodiments, the OBD data include: vehicle basic parameters, vehicle exhaust emission parameters, vehicle fault diagnosis data, and vehicle control data. In an embodiment, the vehicle basic parameters include: current data of powertrain, vehicle identification number (VIN), and calibration identification number (CID). In an embodiment, the vehicle exhaust emission parameters include: oxygen sensor test data, catalyst test data, and variable valve timing (VVT) test data. In an embodiment, the vehicle fault diagnosis data include: freeze frame data, and confirmed diagnostic trouble code (DTC). In an embodiment, the current data of powertrain include, but be not limited to, engine coolant temperature, fuel control system status, fuel correction, ignition timing advance, intake air temperature, manifold air pressure, air flow, engine speed, throttle position sensor output values, secondary air status, calculated load value, vehicle speed, and fuel pressure. In an embodiment, the freeze frame data, i.e., stored engine status data at the time of failure, include, but be not limited to, calculated load value, engine speed, fuel correction value, fuel pressure, vehicle speed, coolant temperature, intake branch pipe pressure, closed loop or open loop operation status, and fault codes that cause the above data to be stored. In an embodiment, the OBD data meet the second on-board diagnostics (OBD II) standard.

In an embodiment, the processor 10 is specifically configured to select at least some of the OBD data as the target OBD data. In another embodiment, the processor 10 is specifically configured to calculate the target OBD data based on at least some of the OBD data. The processor 10 can output the OBD data directly as the target OBD data, or calculate the target OBD data based on the OBD data, so as to meet the needs of different OBD data in different scenes.

The OBD circuit 120 of the OBD electronic tag device 1000 can obtain the OBD data of the vehicle 4000, and the processor can obtain the target data based on the OBD data obtained from the vehicle, therefore the OBD electronic tag device is not only used for the toll collection without stopping, but also can be used in the variety of application scenes because the OBD data can be obtained.

With the global warming, issues related to carbon emissions, mainly carbon dioxide emissions, are increasingly concerned. The amount of carbon dioxide in automobile exhaust gas accounts for nearly a quarter of the total carbon dioxide emission. With the increase of vehicle ownership, the carbon dioxide emissions will also increase, thus it is necessary to detect and monitor the carbon emissions of vehicles, so that the traffic management department or environmental protection department can evaluate the implementation effect of traffic energy conservation and emission reduction measures, or find vehicles with excessive carbon emissions in the traffic system for supervision and management.

Based on this, in an embodiment, the processor 10 of the OBD electronic tag device 1000 converts the target OBD data, the RFID tag chip 40 stores the converted target OBD data, and the server 2100 obtains the converted target OBD data through the RFID tag chip 40. The server 2100 may be the authenticated ETC server, and the converted target OBD data may include vehicle exhaust data. The authenticated ETC server can obtain the vehicle exhaust data from the RFID tag chip 40, it is convenient for relevant departments such as traffic management department or environmental protection department to monitor the carbon emissions of vehicles and thus it is beneficial for the relevant departments to manage vehicles. As a result, the traffic management department or environmental protection department can evaluate the implementation effect of traffic energy conservation and emission reduction measures, and find out vehicles with excessive carbon emissions in the traffic system for supervision and management.

In addition, at present, there is a problem that automobile drivers e.g., truck drivers steal gasoline in logistics companies. That is, after driving out, truck drivers will stop halfway to steal gasoline from trucks. Because logistics companies have no way to monitor the use of gasoline, they cannot judge whether truck drivers steal gasoline, which leads to an increase in the company's operating costs.

Based on this, in an embodiment, the target OBD data include the vehicle basic parameters such as a fuel consumption, a driving distance, an odometer data, and a fuel tank level. When the truck driver drives the truck disposed with the OBD electronic tag device, the logistics company can know the driving conditions of the truck, and thus it can determine whether the truck driver steal gasoline, thereby avoiding the problem of the truck driver stealing gasoline, and the transportation cost of the logistics company can be reduced.

In addition, in an embodiment, the target OBD data include the vehicle fault diagnosis data, vehicle maintenance personnel can directly obtain the vehicle fault diagnosis data for vehicle fault diagnosis and vehicle maintenance, the operation of obtaining data is simple and efficient.

It is noted that, the OBD electronic tag device 1000 is not limited to the above three application scenes, and other scenes where the OBD data needs to be acquired for management and monitoring of the vehicle are applicable to the OBD electronic tag device 1000 provided in the disclosure.

In some embodiment, the server 2100 is a cloud server. In other embodiments, the server 2100 is a personal server, an enterprise server, or a government server. It should be noted that the disclosure does not limit the type and source of the server 2100. In some embodiments, the server 2100 is the authenticated ETC server. It should be noted that the server 2100 obtains the data from the RFID tag chip, which can be understood as indirect communication, i.e., a RFID tag reader is disposed on where needed, and the RFID tag reader can obtain the data from the RFID tag chip and sends it to the server 2100.

In an embodiment, the processor 10 is a microprocessor. In an embodiment, the OBD circuit 120 includes a CAN (abbreviation for Controller Area Network) to UART (abbreviation for Universal Asynchronous Receiver/Transmitter) converter connected to the processor 10 and configured to connect the OBD interface 4100 of the vehicle 4000. The CAN to UART converter can perform data format conversion, it is convenient for the OBD electronic tag device 1000 to communicate with the vehicle 4000. In an embodiment, the CAN to UART converter is a CAN to UART converter 121 shown in FIG. 5.

Specifically, in some embodiments, the processor 10 is connected to the CAN to UART converter 121 via a UART bus, the CAN to UART converter 121 is connected to the OBD interface 4100 via a CAN bus, and the CAN to UART converter 121 can convert data between CAN format and UART format.

In some embodiments, the RFID tag chip 40 is an ISO18000-6C tag chip. The processor 10 is configured to perform data format conversion on the OBD data to obtain the converted OBD data meeting ISO18000-6C standard and transmit the converted OBD data to the RFID tag chip 40. Specifically, for example, the RFID tag chip 40 is a Monza® X-8K tag chip. The disclosure does not limit the RFID tag chip 40, the foregoing is only for easy understanding. In some embodiments of the disclosure, the processor 10 has the function of data format conversion to match the RFID tag chip 40.

Figure 2:
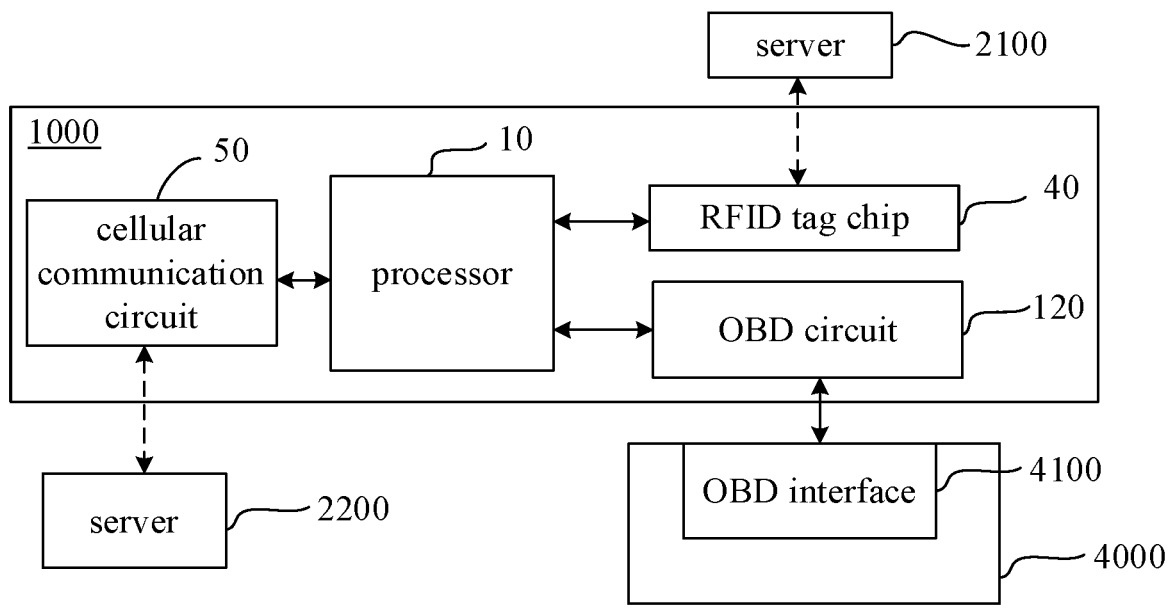
FIG. 2 shows a schematic structural diagram of an electronic tag device according to an embodiment of the disclosure.

In an illustrated embodiment, as shown in FIG. 2, the OBD electronic tag device 1000 further includes: a cellular communication circuit 50. The cellular communication circuit 50 is connected to the processor 10 and configured to wirelessly connect a server 2200. The processor 10 is further configured to obtain target OBD data based on the OBD data obtained from the OBD interface 4100 through the OBD circuit 120, and transmit the target OBD data to the cellular communication circuit 50 to thereby allow the server 2200 to obtain the target OBD data from the cellular communication circuit 50.

In some embodiments, the processor 10 is specifically configured to select at least some of the OBD data as the target OBD data, or the processor 10 is specifically configured to calculate the target OBD data based on at least some of the OBD data; the cellular communication circuit 50 is specifically configured to receive the target OBD data, encrypt the target OBD data, and wirelessly transmit the encrypted target OBD data to the server 2200. In addition to the communication function, the cellular communication circuit 50 further has the data encryption function, which ensures the security of data transmission.

In some embodiments, the processor 10 outputs different target OBD data to the RFID tag chip 40 and the cellular communication circuit 50, that is to say, the processor 10 obtains different target OBD data based on different OBD data, and then output different target OBD data to the RFID tag chip 40 and the cellular communication circuit 50. In other embodiments, the processor 10 outputs the same target OBD data to the RFID tag chip 40 and the cellular communication circuit 50.

Figure 5:
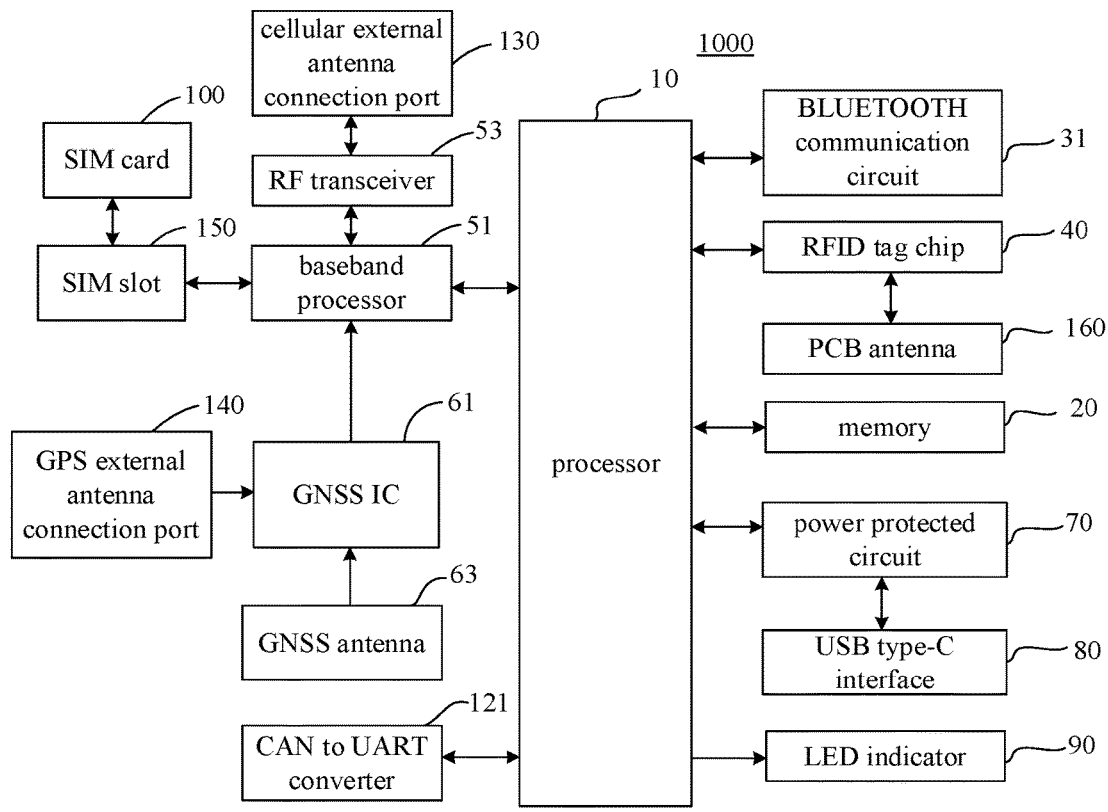
FIG. 5 shows a schematic structural diagram of an electronic tag device according to an embodiment of the disclosure.
Figure 7:
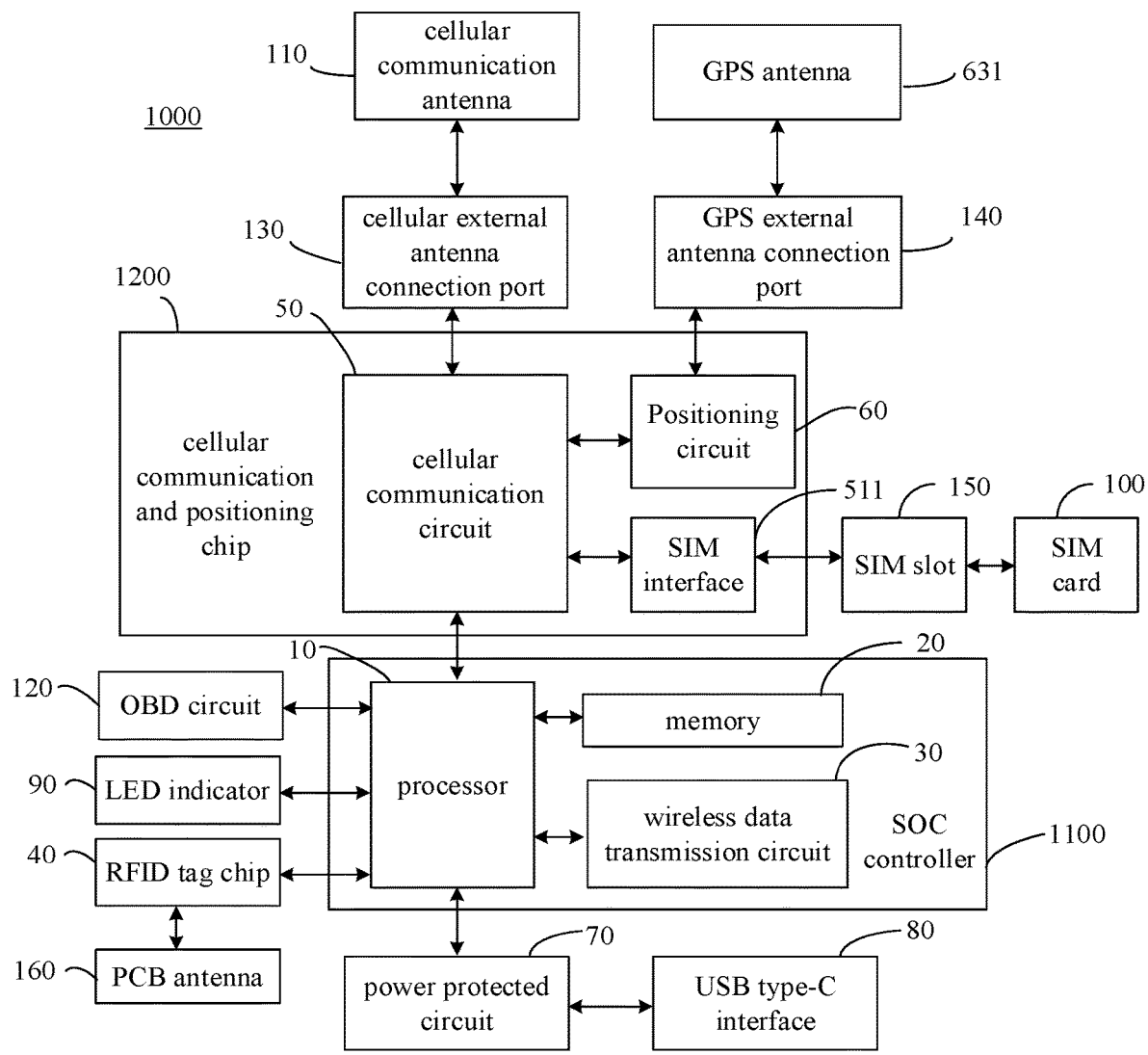
FIG. 7 is a schematic structural diagram of an electronic tag device according to an embodiment of the disclosure.

In some embodiments, the cellular communication circuit 50 includes: a baseband processor connected to the processor 10, and a RF transceiver connected to the baseband processor. For example, the baseband processor is a baseband processor 51 as shown in FIG. 5, the RF transceiver is a RF transceiver 53 as shown in FIG. 5. In some embodiments, the baseband processor is provided with a SIM interface configured to connect a SIM card. In one embodiment, the SIM interface is a SIM interface 511 as shown in FIG. 7, and the SIM card is a SIM card as shown in FIG. 5.

In some embodiments, the server 2200 is the same as the server 2100, or different from the server 2100. Moreover, in some embodiments, the server 2200 is an independent physical server, a server cluster or distributed system composed of multiple physical servers, or, cloud servers or server clusters that provide cloud services, cloud databases, cloud computing, cloud functions, cloud storage, network services, cloud communications, middleware services, domain name services, security services, content delivery network (CDN), big data, artificial intelligence platforms and other basic cloud computing services. In other embodiments, the server 2200 is a personal server, an enterprise server, or a government server. It should be noted that the disclosure does not limit the type and source of the server 2200.

In an embodiment, the processor 10 of the OBD electronic tag device 1000 obtains the OBD data from the OBD circuit 120, the processor 10 then obtains target OBD data based on the OBD data and transmit to the cellular communication circuit 50, and the server 2200 obtains the target OBD data from the cellular communication circuit 50. On the one hand, the OBD electronic tag device 1000 can output the target OBD data through the RFID tag chip 40 to the server 2100, and on the other hand, the OBD electronic tag device 1000 can output the target OBD data through the cellular communication circuit 50 to the server 2200, so that the OBD electronic tag device 1000 can be used in many scenes by providing two modes to output the target OBD data.

Figure 3:
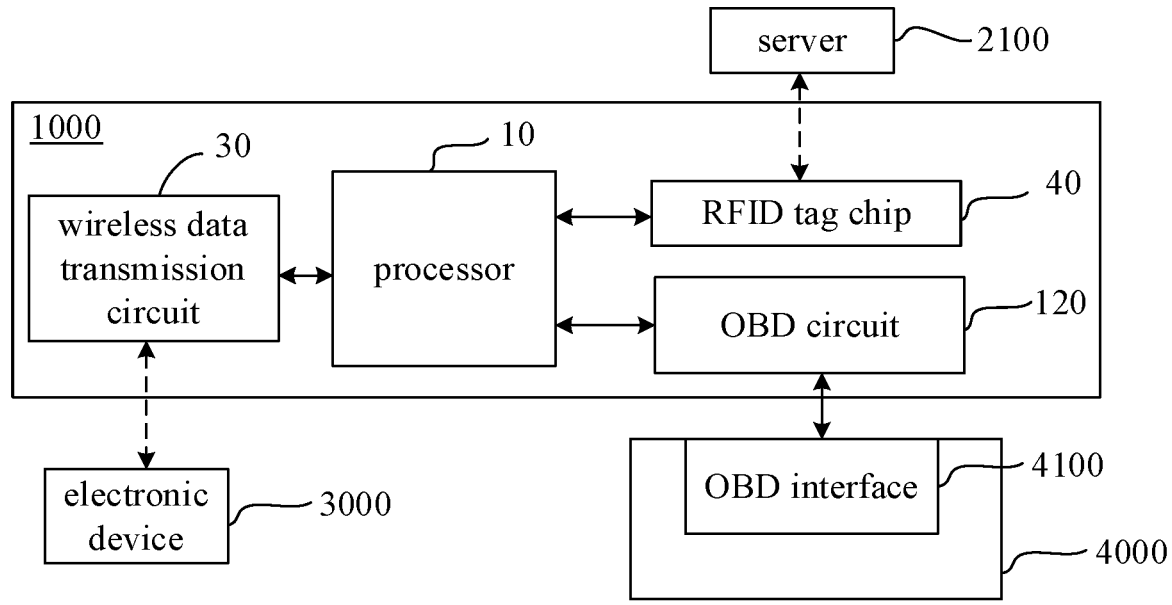
FIG. 3 shows a schematic structural diagram of an electronic tag device according to an embodiment of the disclosure.

In an illustrated embodiment, as shown in FIG. 3, the OBD electronic tag device 1000 further includes a wireless data transmission circuit 30. The wireless data transmission circuit 30 is connected to the processor 10 and configured to wirelessly connect an electronic device 3000. The processor 10 is further configured to obtain target OBD data based on the OBD data obtained from the OBD interface 4100 through the OBD circuit 4000, and transmit the target OBD data to the wireless data transmission circuit 30 to thereby allow the electronic device 3000 to obtain the target OBD data from the wireless data transmission circuit 30 for user viewing.

In some embodiments, the processor 10 is specifically configured to select at least some of the OBD data as the target OBD data, or the processor 10 is specifically configured to calculate the target OBD data based on at least some of the OBD data; and the wireless data transmission circuit 30 is specifically configured to receive the target OBD data, encrypt the target OBD data, and wirelessly transmit the encrypted target OBD data to the electronic device 3000. In addition to the communication function, the wireless data transmission circuit 30 further has the data encryption function, which ensures the security of data transmission.

In some embodiments, the processor 10 outputs different target OBD data to the RFID tag chip 40 and the wireless data transmission circuit 30, that is to say, the processor 10 obtains different target OBD data based on different OBD data, and then outputs different target OBD data to the RFID tag chip 40 and the wireless data transmission circuit 30. In other embodiments, the processor 10 outputs the same target OBD data to the RFID tag chip 40 and the wireless data transmission circuit 30.

Specifically, in an embodiment, the wireless data transmission circuit 30 includes: a BLUETOOTH communication circuit connected to the processor 10 and configured to wirelessly connect the electronic device 3000. For example, the BLUETOOTH communication circuit is a BLUETOOTH communication circuit 31 shown in FIG. 5.

In an illustrated embodiment, referring to FIG. 5, the OBD electronic tag device 1000 further includes: a memory 20 connected to the processor 10. The BLUETOOTH communication circuit 31 is further configured to receive BLUETOOTH data from the electronic device 3000, convert the BLUETOOTH data, and transmit the converted BLUETOOTH data to the processor 10. The processor 10 is configured to store the converted BLUETOOTH data into the memory 20. The user can store the data into the OBD electronic tag device 1000 through the electronic device 3000, thereby facilitating user's operation.

In some embodiments, the user can obtain required data for viewing from the OBD electronic tag device 1000 through the wireless data transmission circuit 30. Specifically, the processor 10 obtains data to be displayed from the memory 20, and transmit the data to be displayed to the BLUETOOTH communication circuit 31. The BLUETOOTH communication circuit 31 then receives the data to be displayed, converts the data to be displayed and then outputs the converted data to be displayed to the electronic device 3000 for user viewing. The data to be displayed exemplarily include the OBD data and other tag data other than the OBD data.

The OBD electronic tag device 1000 communicates with the electronic device 3000 through the BLUETOOTH communication circuit 31, which can transmit the data that the user needs to view to the electronic device 3000 through the BLUETOOTH communication circuit 31 and store new data into the OBD electronic tag device 1000 through the BLUETOOTH communication circuit 31, it is convenient for the user to understand relevant information of the OBD electronic tag device 1000 and to operate the OBD electronic tag device 1000.

In an exemplary embodiment, the electronic device 3000, such as the mobile phone of the user, sends a BLUETOOTH connection request to the OBD electronic tag device 1000, at this time, the BLUETOOTH communication circuit 31 of the OBD electronic tag device 1000 is in a request detection state, when the BLUETOOTH connection request is detected by the BLUETOOTH communication circuit 31 of the OBD electronic tag device 1000, the BLUETOOTH communication circuit 31 determines whether to response to this request, after the BLUETOOTH communication circuit 31 responds to this request, an application (APP) of the mobile phone sends another BLUETOOTH connection request to a BLUETOOTH server; the BLUETOOTH server receives the another BLUETOOTH connection request and determines whether to allow the connection between the mobile phone and the OBD electronic tag device 1000, when the BLUETOOTH server allows the connection, the mobile phone can be connected to the OBD electronic tag device 1000 through the BLUETOOTH communication circuit 31 for bi-directional data transmission. When the BLUETOOTH server does not allow the connection, the mobile phone determines whether the requests reach three times, if the requests do not reach three times, the mobile phone is disconnected with the BLUETOOTH server, if the requests reach the three times, the APP sends the BLUETOOTH connection request to the BLUETOOTH server again. The aforementioned BLUETOOTH connection process can be understood as the process of establishing the BLUETOOTH communication between the OBD electronic tag device 1000 and the electronic device 3000 for the first time, in the subsequent BLUETOOTH communication process, there is no need to establish the BLUETOOTH connection process again.

In an exemplary embodiment, after the electronic device 3000 is connected to the BLUETOOTH communication circuit 31 of the OBD electronic tag device 1000 successfully, the electronic device 3000 can communicate with the OBD electronic tag device 1000, the APP of the electronic device 3000 can write data into the OBD electronic tag device 1000, get data from the OBD electronic tag device 1000, and control the OBD electronic tag device 1000 to switch data and obtain the switched data.

In an illustrated embodiment, the BLUETOOTH communication circuit 31 includes: a BLUETOOTH antenna, and a BLUETOOTH transceiver connected to the BLUETOOTH antenna. The BLUETOOTH transceiver is connected with the processor 10.

In an illustrated embodiment, the BLUETOOTH communication circuit 31, the processor 10 and the memory 20 are integrated in a single chip, for example, a system-on-chip (SoC) controller. For example, the SoC controller is a chip with a model of ESP32-C3. Moreover, as an example, the SoC controller is a SoC controller 1100 shown in FIG. 6.

Specifically, in some embodiments, the electronic device 3000 is a smart phone (such as a phone with the android operating system, a phone with the iPhone operation system (IOS), etc.), a tablet computer, a laptop, a mobile internet device (MID), a desktop computer, a smart appliance, a vehicle-mounted terminal (such as a vehicle navigation terminal, a vehicle computer, etc.), or a smart watch, etc. It should be noted that the disclosure does not limit the specific type of the electronic device 3000. As an example, the electronic device 3000 is the smart phone of a user.

In an embodiment, the processor 10 of the OBD electronic tag device 1000 obtains the OBD data from the OBD circuit 120, the processor 10 then obtains the target OBD data based on the OBD data, and transmits the target OBD data to the wireless data transmission circuit 30, and the electronic device 3000 obtains the target OBD data from the wireless data transmission circuit 30. On the one hand, the OBD electronic tag device 1000 can output the target OBD data through the RFID tag chip 40 to the server 2100; and on the other hand, the OBD electronic tag device 1000 can output the target OBD data through the wireless data transmission circuit 30 to the electronic device 3000, so that it is convenient for the user to obtain the target OBD data directly from the electronic device 3000 such as the smart phone for viewing.

It is worth mentioning that the OBD electronic tag device 1000 disclosed in the disclosure can have the three data transmission modes described above at the same time, thus expanding the application scope of the OBD electronic tag device 1000, that is to say, the OBD electronic tag device 1000 includes the processor 10, the RFID tag chip 40, the OBD circuit 120, the cellular communication circuit 50, and the wireless data transmission circuit 30; and the OBD electronic tag device 1000 can output the different target OBD data or the same target OBD data through the RFID tag chip 40, the wireless data transmission circuit 30 and the cellular communication circuit 50.

Figure 4:
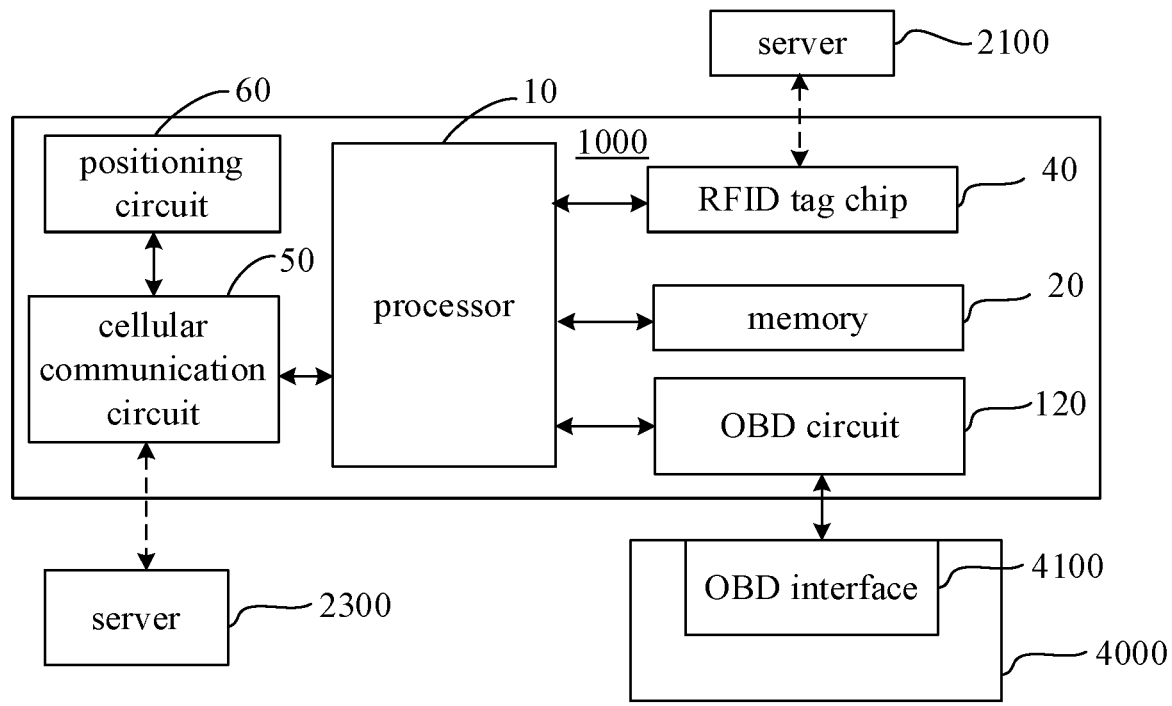
FIG. 4 shows a schematic structural diagram of an electronic tag device according to an embodiment of the disclosure.

In an illustrated embodiment, on the basis of the illustration of FIG. 1, as shown in FIG. 4, the OBD electronic tag device 1000 further includes: the cellular communication circuit 50, the memory 20 and a positioning circuit 60. The cellular communication circuit 50 is connected to the processor 10 and configured to wirelessly connect a server 2300, the memory 20 is connected to the processor 10 and configured to store multiple sets of tag data corresponding to different geographic regions, and the positioning circuit 60 is connected to the cellular communication circuit 50.

Specifically, the positioning circuit 60 is configured to obtain current positional data of the OBD electronic tag device 1000 and transmit the current positional data to the cellular communication circuit 50. The cellular communication circuit 50 is configured to receive the current positional data, wirelessly transmit the current positional data to the server 2300 to thereby enable the server 2300 to output a tag data updating instruction in response to a current geographical region where the OBD electronic tag device 1000 is located determined by the current positional data is different from a previously determined geographical region, wirelessly receive the tag data updating instruction from the server 2300, and transmit the tag data updating instruction to the processor 10. The processor 10 is further configured to obtain a target set of tag data corresponding to the tag data updating instruction from the multiple sets of tag data stored in the memory 20 and transmit the target set of tag data to the RFID tag chip 40 for tag data updating.

Specifically, in an embodiment, each set of the multiple sets of tag data include: an electronic product code (EPC), and a tag identifier (TID). The TIDs of the multiple sets of tag data include multiple account information corresponding to the different geographical regions, respectively. For example, the different geographical regions are different administrative regions, such as different states in the United States of America (USA). The TID of the target set of tag data, for example, includes one of the multiple account information corresponding to the current geographical region being one of the different geographical regions.

Specifically, the multiple account information corresponding to different geographical regions can be understood as that the user registers accounts in the different geographical regions respectively to store the multiple account information of the geographical regions in the memory 20.

At present, a non-stop electronic toll collection system is an advanced road toll collection system. By installing an electronic tag device on a vehicle, when the vehicle is approaching a toll station, the electronic tag device and the toll station wirelessly communicate with each other, and then the vehicle can be recorded for subsequent toll settlement. However, in the U.S.A, the vehicle traveling across different geographical regions, such as the vehicle traveling across different states in the U.S.A, will encounter an additional expense for toll settlement in case of the electronic tag device of the vehicle bound with only one account information, which has a great impact on some industries, such as the automobile leasing industry. Generally, the automobile leasing is carried out at a fixed fee. When a leaseholder drives the vehicle across the different states, the vehicle will encounter the additional expense, which need to be borne by the automobile leasing company itself. In this way, the revenue and development of the automobile leasing company will be greatly affected. For example, an automobile leasing company registers an account for an electronic tag device in New Mexico, the electronic tag device stores account information corresponding to New Mexico, the automobile e.g., car disposed with the electronic tag device will not encounter the additional expense when being driven in New Mexico. However, when a leaseholder drives the car from New Mexico to Texas, in addition to a road toll, the car will encounter an additional expense when the car enters Texas caused by the electronic tag device of the car being bound with only the account information corresponding to the New Mexico, the additional expense can be understood as a handling fee incurred due to crossing different states, which greatly limits the development of the automobile leasing industry.

The OBD electronic tag device 1000 is disposed on the vehicle 4000, which can avoid the above additional expense. Specifically, the memory 20 stores the multiple sets of tag data corresponding to different geographical regions respectively, the positioning circuit 60 obtains the current positional data of the OBD electronic tag device 1000 in real time or periodically, i.e., the positioning circuit 60 obtains the current positional data of the vehicle and transmits the current positional data to the cellular communication circuit 50, the cellular communication circuit 50 outputs the current positional data to the server 2300 to enable the server 2300 to output the tag data updating instruction when the geographical region, where the OBD electronic tag device 1000 is located, changes, i.e., when the vehicle travels cross the different geographical regions, the cellular communication circuit 50 receives the tag data updating instruction from the server 2300 and transmits the tag data updating instruction to the processor 10, the processor 10 obtains the target set of tag data corresponding to the tag data updating instruction from the multiple sets of tag data and transmits the target set of tag data to the RFID tag chip 40, the RFID tag chip 40 updates a previous set of tag data to the target set of tag data to complete tag data updating. Therefore, when the vehicle is driven across the different geographical regions, no additional expense is incurred because non-local tag data (i.e., the previous set of tag data) has been replaced by local tag data (i.e., the target set of tag data). The OBD electronic tag device 1000 provided by the embodiment disposed on the vehicle can save the additional expense for toll settlement caused by the existing electronic tag device of the vehicle being bound with only one account information, and it is conducive to the development of the car leasing industry.

In an illustrated embodiment, the previously determined geographical region refers to a geographical region determined by immediately previous positional data, i.e., the previously determined geographical region is an immediately previous determined geographical region. The current geographical region where the OBD electronic tag device 1000 is located determined by the current positional data is different from the previously determined geographical region, which can be understood that the geographical region, where the OBD electronic tag device 1000 is located, changes, i.e., the current positional data is not within a data range of the previously determined geographical region and is within a data range of the current geographical region.

For example, when the RFID tag chip 40 of the OBD electronic tag device 1000 stores the account information of the geographical region A, when a vehicle installed with the OBD electronic tag device 1000 is driven in the geographical region A, as the RFID tag chip 40 stores local tag data of the geographical region A, no additional cost is incurred. When the vehicle is driven from the geographical regions A to B, the RFID tag chip 40 of the OBD electronic tag device 1000 can update the account information of the geographical region A to the account information of the geographical region B, at this time, as the RFID tag chip 40 stores local tag data of the geographical region B, and there is no the additional expense.

In an illustrated embodiment, the positioning circuit 60 supports at least one selected from the group consisting of a global positioning system (GPS), a BeiDou navigation satellite system (BDS), a Galileo satellite navigation system (GALILEO) and a GLONASS (i.e., the abbreviation of "global navigation satellite system" in Russian).

In an illustrated embodiment, as illustrated in FIG. 5, the positioning circuit 60 includes: a GNSS IC 61 connected to the cellular communication circuit 50 and a GNSS antenna 63 connected to the GNSS IC 61. Specifically, the GNSS IC 61 is connected to the baseband processor 51 of the cellular communication circuit 50. The GNSS IC 61 is, for example, a chip with a model of UBX-M8.

For example, the GNSS IC 61 is a GPS IC, the GNSS antenna 63 is a GPS antenna. As shown in FIG. 7, there may be another GPS antenna 631 as external GPS antenna to connect the positioning circuit 60.

It is worth mentioning here that, in another illustrated embodiment, the positioning circuit 60 includes: the GNSS IC 61, and the GNSS IC 61 is provided with a GNSS antenna therein. In a still another illustrated embodiment, the positioning circuit 60 includes: the GNSS IC 61, and the GNSS antenna 63 connected to the GNSS IC 61. In addition, the GNSS IC 61 is, for example, provided with another GNSS antenna therein.

The OBD electronic tag device 1000 having the positioning circuit 60 can obtain better positioning effect in different environments.

In an illustrated embodiment, the cellular communication circuit 50 is specifically configured to receive the current positional data, encrypt the current positional data, and wirelessly transmit the encrypted current positional data to the server 2300. In addition to the communication function, the cellular communication circuit 50 further has the data encryption function, which ensures the security of data transmission.

In an illustrated embodiment, the cellular communication circuit 50 is specifically configured to wirelessly receive the tag data updating instruction after being encrypted by the server 2300, decrypt the received tag data updating instruction, and transmit the decrypted tag data updating instruction to the processor 10. In addition to the communication function, the cellular communication circuit 50 further has the data decryption function, which ensures the security of data transmission.

Specifically, in some embodiments, the server 2300 is the same as the server 2200, or the server 2300 is different from the server 2200. In some embodiments, at least some of the server 2100, the server 2200 and the server 2300 is the same server, or the server 2100, the server 2200 and the server 2300 are different servers respectively. In some embodiments, the server 2300 is an independent physical server, a server cluster or distributed system composed of multiple physical servers, or, cloud servers or server clusters that provide cloud services, cloud databases, cloud computing, cloud functions, cloud storage, network services, cloud communications, middleware services, domain name services, security services, content delivery network (CDN), big data, artificial intelligence platforms and other basic cloud computing services. For another example, the server 2300 is a personal server, an enterprise server, or a government server. It should be noted that the disclosure does not limit the type and source of the server 2300.

In an illustrated embodiment, as shown in FIG. 5, the OBD electronic tag device 1000 further includes: a power protected circuit 70, and a USB (abbreviation for Universal Serial Bus) type-C interface 80. The power protected circuit 70 is connected to the processor 10. The USB type-C interface 80 is connected to the power protected circuit 70 and configured to connect an in-vehicle power supply.

In some embodiments, the power protected circuit 70 includes a transient voltage suppression (TVS) diode, and a Schottky barrier diode; for example, a model of the TVS diode is SD24C, and a model of the Schottky barrier diode is 1N5819HW-7-F.

In an embodiment, the USB type-C interface 80 connects a power supply such as an in-vehicle power supply to obtain a power, the power is, for example, 12V. The USB type-C interface 80 can communicate with a personal computer (PC).

Furthermore, the OBD electronic tag device 1000 may include a peripheral interface(s) including at least one of a general purpose input output (GPIO) interface, a serial peripheral interface (SPI) interface, a UART interface, I2C (abbreviation for Inter-integrated Circuit) interface and a I2S (abbreviation for Inter-IC Sound) interface. The disclosure does not limit the specific types of the peripheral interface, which can be set according to the actual situation.

In an illustrated embodiment, as shown in FIG. 5, the OBD electronic tag device 1000 further includes: a LED indicator 90. The LED indicator 90 is connected to the processor 10, and the LED indicator 90 is configured to emit light of different colors for indicating different working states of the OBD electronic tag device 1000. For example, when the OBD electronic tag device 1000 is in a standby mode, the LED indicator 90 may emit yellow light, and when the OBD electronic tag device 1000 is in a working mode, the LED indicator 90 may emit green light.

In an illustrated embodiment, as shown in FIG. 5, the OBD electronic tag device 1000 further includes: a PCB antenna 160. The PCB antenna 160 is connected to the RFID tag chip 40.

In an illustrated embodiment, as shown in FIG. 5, the OBD electronic tag device 1000 further includes: a cellular external antenna connection port 130. The cellular external antenna connection port 130 is connected to the cellular communication circuit 50. For example, the cellular external antenna connection port 130 is connected to the RF transceiver 53 of the cellular communication circuit 50.

In an illustrated embodiment, as shown in FIG. 5, the OBD electronic tag device 1000 further includes: a GPS external antenna connection port 140 connected to the positioning circuit 60. For example, the GPS external antenna connection port 140 is connected to the GNSS IC 61 of the positioning circuit 60.

In an illustrated embodiment, as shown in FIG. 5, the OBD electronic tag device 1000 further includes: a SIM slot 150 connected to the cellular communication circuit 50 and configured to receive the SIM card 100; and the SIM card 100 disposed in the SIM slot 150. The SIM slot 150 may be connected to the baseband processor 51 of the cellular communication circuit 50. The SIM card 100 may be a 4th generation communication system (4G) long term evolution (LTE) nano SIM card or other type cards such as 3G SIM card.

In an illustrated embodiment, the cellular communication circuit 50 and the positioning circuit 60 are integrated in a single chip, for example, a cellular communication and positioning chip. The cellular communication and positioning chip is, for example, a cellular communication and positioning chip 1200 shown in FIG. 6. The cellular communication and positioning chip may be a chip with a model of SARA-R510M8S.

In an illustrated embodiment, the OBD electronic tag device 1000 includes a cellular communication antenna connected to the cellular communication circuit 50. The cellular communication antenna may be a cellular communication antenna 110 shown in FIG. 7. The cellular communication antenna can be integrated in the cellular communication and positioning chip or independent from the cellular communication and positioning chip.

In some embodiments, the baseband processor 51 has the above communication function of the cellular communication circuit 50, and further has the above data encryption function and data decryption function of the cellular communication circuit 50.

In some embodiment, the OBD electronic tag device 1000 is further provided with an emergency rescue button, in the event of a sudden accident, the driver can press the emergency rescue button and waits for rescue.

In order to facilitate the understanding of the disclosure, the OBD electronic tag device 1000 provided in the disclosure is described below in combination with the accompanying drawings.

The OBD electronic tag device 1000 can communicate with at least one server, such as the server 2100, the server 2200 and/or the server 2300, and the electronic device 3000.

Figure 6:
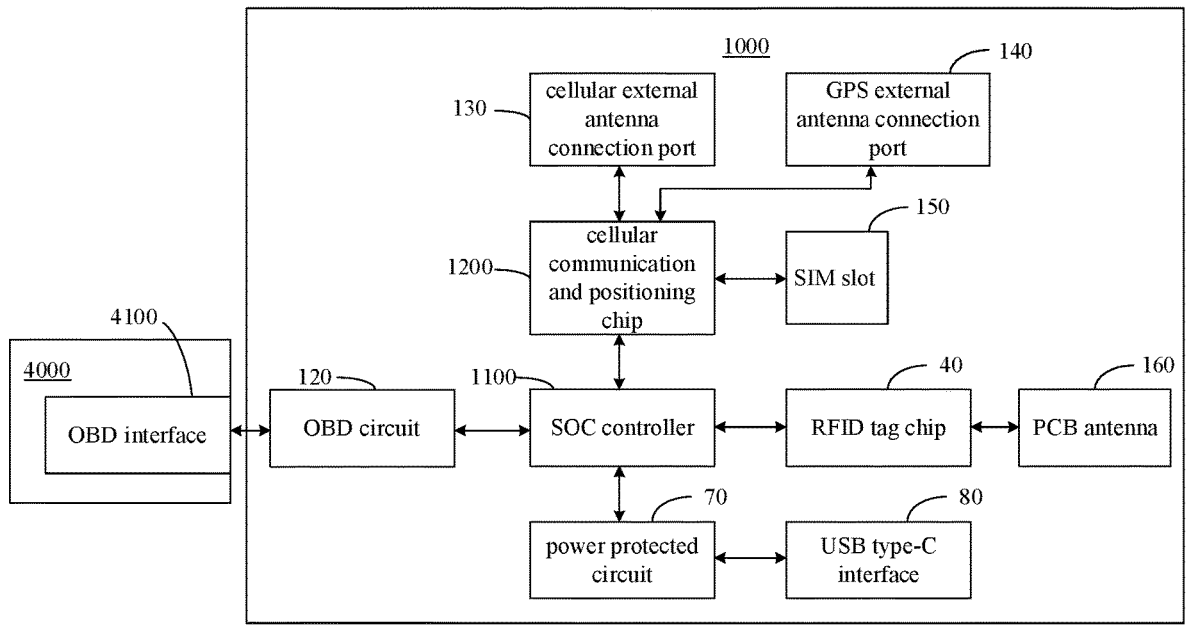
FIG. 6 is a schematic structural diagram of an electronic tag device according to an embodiment of the disclosure.
Figure 8:
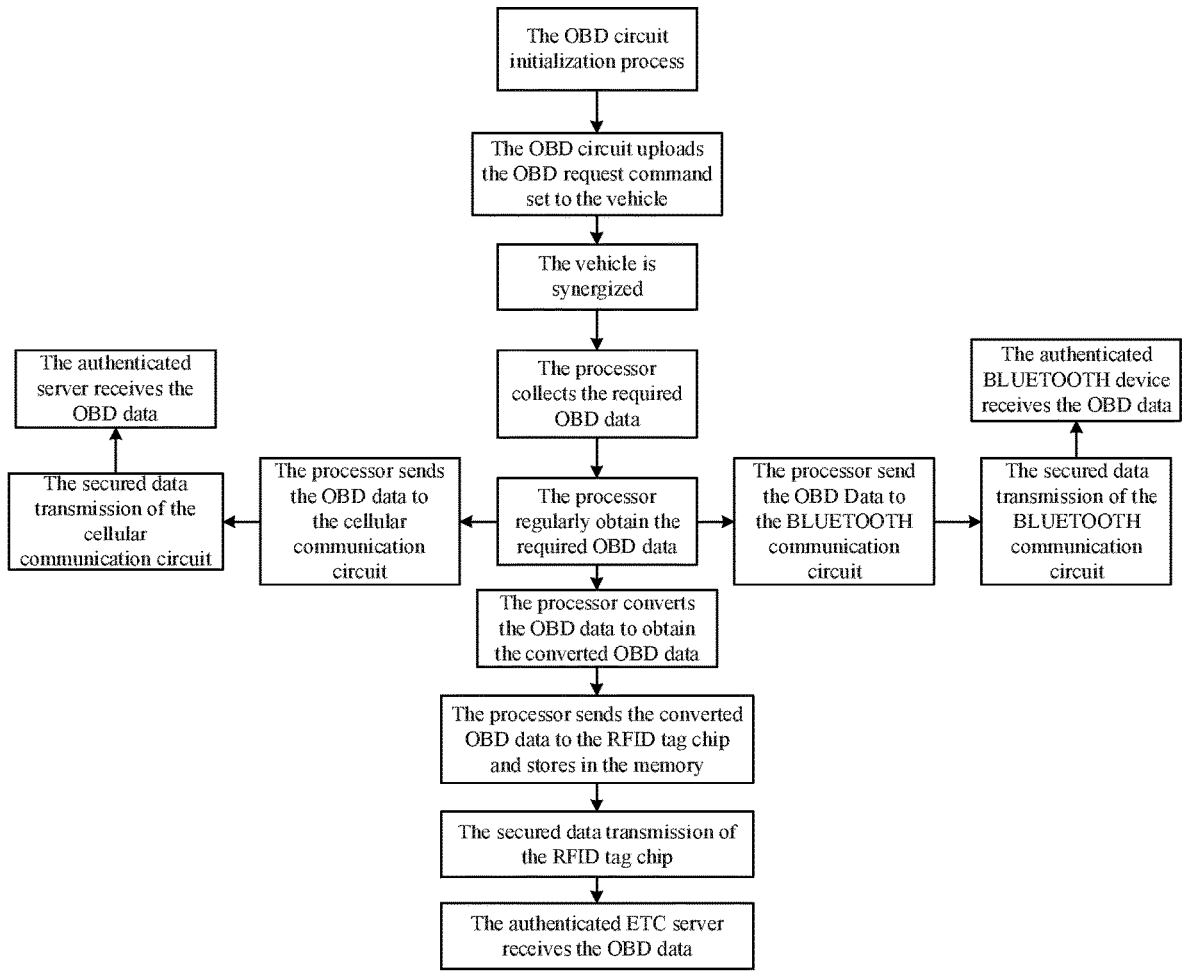
FIG. 8 is a flowchart of a communication progress of an electronic tag device according to an embodiment of the disclosure.

As shown in FIGS. 6 to 8, the OBD electronic tag device 1000 exemplarily includes the SoC controller 1100, the RFID tag chip 40 connected to the SoC controller 1100, the cellular communication and positional chip 1200 connected to the SoC controller 1100, the OBD circuit 120 connected to the SOC controller 1100, the PCB antenna 160 connected to the RFID tag chip 40, the power protected circuit 70 connected to the SOC controller 1100, the USB type-C interface 80 connected to the power protected circuit 70, the SIM slot 150 connected to the cellular communication and positioning chip 1200, the cellular external antenna connection port 130 connected to the cellular communication and positioning chip 1200, and the GPS external antenna connection port 140 connected to the cellular communication and positioning chip 1200.

The SoC controller 1100 is provided with the processor 10, the memory 20, and the wireless dare transmission circuit 30. The processor 10 is connected to the memory 20 and the wireless dare transmission circuit 30. The cellular communication and positioning chip 1200 is provided with the cellular communication circuit 50, the positioning circuit 60 and the SIM interface 511. The cellular communication circuit 50 is connected to the positioning circuit 60 and the SIM interface 511.

In an illustrated embodiment, the SoC controller 1100 is connected to the cellular communication and positioning chip 1200 via a UART bus, the SoC controller 1100 is connected to the RFID tag chip 40 via an I2C bus, the SoC controller 1100 is connected to the OBD circuit 120 via another UART bus, and the OBD circuit 120 is connected to the OBD interface 4100 via a CAN bus.

In an illustrated embodiment, as shown in FIG. 7, the OBD electronic tag device 1000 further includes: the cellular communication antenna 110 connected to the cellular external antenna connection port 130, the GPS antenna connected to the GPS external antenna connection port 140, the SIM card 100 connected to the SIM slot 150, and the LED indicator 90 connected to the processor 10.

In an illustrated embodiment, the SoC controller 1100 may be a chip with a model of ESP32-C3, the RFID tag chip 40 may be a Monza® X-8K tag chip, and the cellular communication and positioning chip 1200 may be a chip with a model of SARA-R510M8S.

Specifically, as shown in FIG. 8, when the OBD electronic tag device 1000 is powered on for the first time, the OBD circuit 120 may complete the initialization process, and the initialization process is not required afterwards.

The processor 10 may transmit the OBD data request command set to the OBD circuit 120. The processor 10 may obtain the OBD data request command set from the memory 20, for example, the processor 10 obtain, in response to user operation, the OBD data request command set from the memory 20; for another example, the processor 10 generate, in response to user operation, the OBD data request command set.

The OBD circuit 120 may obtain the OBD data request command set from the processor 10, and perform data format conversion on the OBD data request command set, and then upload the converted OBD data request command set through the CAN bus to the OBD interface 4100 of the vehicle 4000. The vehicle 4000, in response to the OBD data request command set, output the OBD data corresponding to the OBD data request command set to the OBD electronic tag device 1000, i.e., the vehicle 4000 is synergized.

The OBD circuit 120 may receive the OBD data from the OBD interface 4100 through the CAN bus, and perform data format conversion on the OBD data, and then transmit the OBD data to the processor 10.

The processor 10 may collect the required OBD data (i.e., target OBD data). It can be understood here that, the processor 10 can obtain the OBD data from the OBD circuit 120 to be as the required OBD data, and/or, the processor 10 can obtain the OBD data from the OBD circuit 120, and calculate the required OBD data based on the obtained OBD data; that is to say, the required OBD data may be the obtained OBD data from the vehicle 4000, or may be the OBD data calculated by the processor 10 based on the obtained OBD data from the vehicle 4000.

After the processor 10 obtains the required OBD data, the OBD electronic tag device 1000 provides three data output modes.

In a first data output mode, the processor 10 converts the required OBD data to the converted OBD data meeting a target standard, such as ISO18000-6C standard, and then transmits the converted OBD data to the RFID tag chip 40.

When the server 2100 such as the authenticated ETC server communicates with the RFID tag chip 40, the RFID tag chip 40 can encrypt the converted OBD data for the secured data transmission, and then output the encrypted OBD data to the authenticated ETC server.

In a second data output mode, the processor 10 transmits the required OBD data to the cellular communication circuit 50, when the server 2200 such as the authenticated server communicates with the cellular communication circuit 50, the cellular communication circuit 50 can encrypt the required OBD data for the secured data transmission, and then output the encrypted OBD data to the authenticated server.

In a third data output mode, the processor 10 transmits the required OBD data to the wireless data transmission circuit 30, i.e., the BLUETOOTH communication circuit 31, when the electronic device 3000 such as the authenticated BLUETOOTH device communicates with the BLUETOOTH communication circuit 31, for example, the authenticated BLUETOOTH device request to obtain the required OBD data, the BLUETOOTH communication circuit 31 can encrypt the OBD data for the secured data transmission, and then output the encrypted OBD data to the authenticated BLUETOOTH device.

In addition to the above functions of acquiring and outputting the required OBD data, the OBD electronic tag device 1000 further has the following functions.

The cellular communication circuit 50 can encrypt the current positional data obtained from the positioning circuit 60 and then send it to the authenticated server, the authenticated server decrypts the current positional data, and determines whether the current positional data is within a data range of the immediately previous geographical region, when the authenticated server determines that the current positional data is not within the data range of the immediately previous geographical region, it can generate a tag data updating instruction corresponding to the current positional data, i.e., when the current positional data indicates that the current geographical region where the OBD electronic tag device 1000 is located is different from the immediately previous geographical region, the authenticated server can generate and encrypt the tag data updating instruction, and output the encrypted tag data updating instruction, which can be taken as responding to the current positional data.

The cellular communication circuit 50 receives the encrypted tag data updating instruction from the authenticated server, decrypts the encrypted tag data updating instruction and then transmits the tag data updating instruction to the processor 10, the processor 10 obtains the target set of tag data corresponding to the tag data updating instruction from the multiple sets of tag data stored in the memory 20 and transmits the target set of tag data to the RFID tag chip 40. The RFID tag chip 40 updates a previous set of tag data to the target set of tag data, for tag data updating. It can be understood here that the required OBD data and the previous set of tag data are stored in different storage areas of the RFID tag chip 40.

When the OBD electronic tag device 1000 communicates with the authenticated server for the first time, the OBD electronic tag device 1000 may be initialized, and then the OBD electronic tag device 1000 make a registration request to the authenticated server, the authenticated server receives the registration request, and determines whether to respond to the registration request, when the authenticated server responses to the registration request, the OBD electronic tag device 1000 communicates with the authenticated server successfully; when the authenticated server dose not response to the registration request, the OBD electronic tag device 1000 can make the registration request again. After the OBD electronic tag device 1000 communicates with the authenticated server successfully, the OBD electronic tag device 1000 can transmit the data to the authenticated server through the cellular communication circuit 50.

To sum up, in the disclosure, the OBD electronic tag device 1000 is provided with the OBD circuit 120 for connecting the OBD interface 4100 of the vehicle 4000, the OBD circuit 120 of the OBD electronic tag device 1000 can obtain the OBD data from the vehicle 4000, and the processor 10 can obtain the target OBD data based on the OBD data obtained from the vehicle 4000, therefore the OBD electronic tag device 1000 is not only used for the toll collection without stopping, but also can be used in the variety of application scenes because the OBD data can be obtained.

In an application scene, the processor 10 of the OBD electronic tag device 1000 can convert the target OBD data, the RFID tag chip 40 can store the converted target OBD data, the server 2100 can obtain the converted target OBD data through the RFID tag chip 40, the server 2100 may be the authenticated electronic toll collection (ETC) server and the converted target OBD data may include vehicle exhaust data, the authenticated ETC server can obtain the vehicle exhaust data from the RFID tag chip 40, therefore it is convenient for relevant departments such as traffic management department or environmental protection department to monitor the carbon emissions of the vehicles, and it is beneficial for the relevant departments to manage vehicles.

In another application scene, the target OBD data may include vehicle basic parameters such as a fuel consumption, a driving distance, an odometer data, and a fuel tank level; in the logistics company, when the car driver drives the car disposed with the OBD electronic tag device 1000, the logistics company can know driving conditions of the car based on the target OBD data, and thus it can avoid the problem of the car driver stealing fuel such as gasoline on the way, and the transportation cost of the logistics company can be reduced.

In a still another application scene, the target OBD data may include vehicle fault diagnosis data, vehicle maintenance personnel can directly obtain the vehicle fault diagnosis data for vehicle fault diagnosis and vehicle maintenance, the operation of obtaining data is simple and efficient.

The OBD electronic tag device 1000 can obtain the target OBD data based on the OBD data, and output the target OBD data through the RFID tag chip 40, the cellular communication circuit 50 and/or the wireless data transmission circuit 30, thereby to meet actual needs, and the application scope of the OBD electronic tag device 1000 is wider.

Furthermore, the memory 20 of the OBD electronic tag device 1000 can be stored with the multiple sets of tag data corresponding to different geographic regions respectively, the OBD electronic tag device 1000 can acquire the positional data in real time or periodically and transmit the positional data to the server, the server output the tag data updating instruction when it determines that the current geographical region where the OBD electronic tag device 1000 is located determined by the positional data is different from a previously determined geographical region, i.e., the geographical region of the OBD electronic tag device 1000 has changed, the OBD electronic tag device 1000 obtain the target set of tag data corresponding to the tag data updating instruction from the multiple sets of tag data. Therefore, when the OBD electronic tag device 1000 disclosed by the disclosure is disposed on the vehicle, an additional expense for toll settlement caused by an existing electronic tag device of the vehicle being bound with only one account information can be saved. It is conducive to the development of the automobile leasing industry.

The above description is only some of embodiments of the disclosure, which does not limit a scope of protection of the disclosure. Without departing from the spirit and scope of the disclosure, the disclosure will also have various changes and improvements. Under the inventive concept of the disclosure, the equivalent structural substitutions made based on the description and attached drawings of the disclosure, and/or the above described embodiments directly or indirectly applied in other relevant technical fields, should be included in the scope of protection of the disclosure.

What is claimed is:

1. An electronic tag device, comprising:
   a processor;
   an on-board diagnostics (OBD) circuit, connected to the processor; and
   a radio frequency identification (RFID) tag chip, connected to the processor;
   wherein the processor is configured to transmit an OBD data request command set to an OBD interface of a vehicle through the OBD circuit to thereby enable the vehicle to output OBD data in response to the OBD data request command set; and the processor is further configured to obtain first target OBD data based on the OBD data obtained from the OBD interface through the OBD circuit and convert a data format of the first target OBD data to obtain the converted first target OBD data meeting ISO18000-6C; and the OBD data comprises: static data including vehicle identification number (VIN), and dynamic data including at least one of a fuel tank level, odometer data and vehicle exhaust emission parameters; and
   wherein the RFID tag chip is configured to obtain and store the converted first target OBD data meeting ISO18000-6C from the processor to thereby allow a first server to obtain the converted first target OBD data meeting ISO18000-6C from the RFID tag chip.

2. The electronic tag device according to claim 1, further comprising:
   a cellular communication circuit, connected to the processor and configured to wirelessly connect a second server;
   wherein the processor is further configured to obtain second target OBD data based on the OBD data obtained from the OBD interface through the OBD circuit, and transmit the second target OBD data to the cellular communication circuit to thereby allow the second server to obtain the second target OBD data from the cellular communication circuit.

3. The electronic tag device according to claim 2,
   wherein the cellular communication circuit is specifically configured to receive the second target OBD data, encrypt the second target OBD data, and wirelessly transmit the encrypted second target OBD data to the second server.

4. The electronic tag device according to claim 1, further comprising:
   a wireless data transmission circuit, connected to the processor and configured to wirelessly connect an electronic device;
   wherein the processor is further configured to obtain third target OBD data based on the OBD data obtained from the OBD interface through the OBD circuit, and transmit the third target OBD data to the wireless data transmission circuit to thereby allow the electronic device to obtain the third target OBD data from the wireless data transmission circuit for user viewing.

5. The electronic tag device according to claim 4,
   wherein the wireless data transmission circuit is specifically configured to receive the third target OBD data, encrypt the third target OBD data, and wirelessly transmit the encrypted third target OBD data to the electronic device.

6. The electronic tag device according to claim 1, wherein the OBD circuit comprises:

a controller area network (CAN) to universal asynchronous receiver/transmitter (UART) converter, connected to the processor and configured to connect the OBD interface of the vehicle.

7. The electronic tag device according to claim 2, wherein the cellular communication circuit comprises:
   a baseband processor, provided with a subscriber identity module (SIM) interface configured to connect a SIM card; and
   a radio frequency (RF) transceiver, connected to the baseband processor.

8. The electronic tag device according to claim 4, wherein the wireless data transmission circuit comprises: a BLUETOOTH communication circuit connected to the processor and configured to wirelessly connect the electronic device;
   wherein the electronic tag device further comprises: a memory connected to the processor; and
   wherein the BLUETOOTH communication circuit is further configured to receive BLUETOOTH data from the electronic device, convert the BLUETOOTH data, and transmit the converted BLUETOOTH data to the processor; and the processor is configured to store the converted BLUETOOTH data into the memory.

9. The electronic tag device according to claim 1, further comprising:
   a cellular communication circuit, connected to the processor and configured to wirelessly connect a third server;
   a memory, connected to the processor and configured to store multiple sets of tag data corresponding to different geographic regions;
   a positioning circuit, connected to the cellular communication circuit;
   a cellular external antenna connection port, connected to the cellular communication circuit;
   a global positioning system (GPS) external antenna connection port, connected to the positioning circuit;
   a subscriber identity module (SIM) slot, connected to the cellular communication circuit; and
   a SIM card, disposed in the SIM slot;
   wherein the positioning circuit is configured to obtain current positional data of the electronic tag device and transmit the current positional data to the cellular communication circuit;
   wherein the cellular communication circuit is configured to receive the current positional data, wirelessly transmit the current positional data to the third server to thereby enable the third server to output a tag data updating instruction in response to a current geographical region where the electronic tag device is located determined by the current positional data is different from a previously determined geographical region, wirelessly receive the tag data updating instruction from the third server, and transmit the tag data updating instruction to the processor; and
   wherein the processor is further configured to obtain a target set of tag data corresponding to the tag data updating instruction from the multiple sets of tag data stored in the memory and transmit the target set of tag data to the RFID tag chip for tag data updating.

10. The electronic tag device according to claim 9, wherein each set of the multiple sets of tag data comprises: an electronic product code (EPC) and a tag identifier (TID), and the TIDs of the multiple sets of tag data comprise multiple account information corresponding to the different geographical regions respectively, and the TID of the target set of tag data comprises one of the multiple account information corresponding to the current geographical region being one of the different geographical regions.

11. The electronic tag device according to claim 9, wherein the positioning circuit comprises: a global navigation satellite system (GNSS) integrated circuit (IC) connected to the cellular communication circuit, and a GNSS antenna connected to the GNSS IC.

12. The electronic tag device according to claim 9, wherein the electronic tag device further comprises: a wireless data transmission circuit, connected to the processor and configured to connect an electronic device; and
   wherein the memory, the processor and the wireless data transmission circuit are integrated in a system on chip (SoC) controller; and the positioning circuit and the cellular communication circuit are integrated in a cellular communication and positioning chip.

13. The electronic tag device according to claim 12, wherein the SoC controller is connected to the cellular communication and positioning chip via a universal asynchronous receiver/transmitter (UART) bus, the SoC controller is connected to the RFID tag chip via an inter-integrated circuit (I2C) bus, the SoC controller is connected to the OBD circuit via another UART bus, and the OBD circuit is connected to the OBD interface via a CAN bus.

14. The electronic tag device according to claim 1, further comprising:
   a power protected circuit, connected to the processor;
   a universal serial bus (USB) type-C interface, connected to the power protected circuit and configured to connect an in-vehicle power supply;
   a PCB antenna, connected to the RFID tag chip; and
   a light emitting diode (LED) indicator, connected to the processor, and wherein the LED indicator is configured to emit light of different colors for indicating different working states of the electronic tag device.

15. The electronic tag device according to claim 1, wherein the vehicle exhaust emission parameters comprise: oxygen sensor test data, catalyst test data, and variable valve timing (VVT) test data; and the OBD data further comprises: vehicle fault diagnosis data and vehicle control data.

16. The electronic tag device according to claim 1, wherein the first server is an authenticated electronic toll collection system (ETC) server, and the converted first target OBD data comprises vehicle exhaust data meeting the ISO18000-6C; and the RFID tag chip is further configured to encrypt the vehicle exhaust data meeting the ISO18000-6C for secured data transmission and output the encrypted vehicle exhaust data to the authenticated ETC server.

17. The electronic tag device according to claim 1, wherein the electronic tag device further comprises: a memory connected to the processor, the memory stores a plurality of OBD data request commands, and the processor is further configured to select at least one OBD data request command from the plurality of OBD data request commands stored in the memory to form the OBD data request command set.

18. The electronic tag device according to claim 1, wherein the electronic tag device further comprises: a memory connected to the processor, the memory stores a plurality of OBD data request command sets, and the processor is further configured to select the OBD data request command set from the plurality of OBD data request command sets stored in the memory.

19. An electronic tag device, comprises:
   a processor;
   an OBD circuit, connected to the processor;
   a RFID tag chip, connected to the processor;

a cellular communication circuit, connected to the processor; and a BLUETOOTH communication circuit, connected to the processor;

wherein the OBD circuit is configured to receive OBD data from an OBD interface of a vehicle and transmit the OBD data to the processor;

the processor is configured to obtain target OBD data based on the OBD data, wherein the target OBD data comprises vehicle exhaust data, vehicle basic parameters and vehicle fault diagnosis data;

the processor is further configured to convert first OBD data selected from the target OBD data to obtain the converted first OBD data meeting ISO18000-6C, and transmit the converted first OBD data to the RFID tag chip, and the RFID tag chip is configured to encrypt the converted first OBD data for secured data transmission, and then output the encrypted first OBD data to an authenticated ETC server;

the processor is further configured to transmit second OBD data selected from the target OBD data to the cellular communication circuit, and the cellular communication circuit is configured to encrypt the second OBD data for secured data transmission, and then output the encrypted second OBD data to an authenticated server; and the processor is further configured to transmit third OBD data selected from the target OBD data to the BLUETOOTH communication circuit, and the BLUETOOTH communication circuit is configured to encrypt the third OBD data for secured data transmission, and then output the encrypted third OBD data to an authenticated BLUETOOTH device; and the first OBD data, the second OBD data and the third OBD data are different from each other.

20. The electronic tag device according to claim 19, further comprising: a memory, connected to the processor; the memory stores a plurality of OBD data request commands, and the processor is further configured to select, in response to a user operation, at least one OBD data request command from the plurality of OBD data request commands stored in the memory to form an OBD data request command set and transmit the OBD data request command set to the OBD circuit, thereby to enable the OBD circuit to obtain the OBD data corresponding to the OBD data request command set.

* * * * *